US012754505B2

(12) United States Patent
Imanishi et al.

(10) Patent No.: US 12,754,505 B2
(45) Date of Patent: Oct. 6, 2026

(54) IMAGE FORMING APPARATUS THAT CAN PREDICT A LIFE OF THE FIXING ROLLER

(71) Applicant: KYOCERA Document Solutions Inc., Osaka (JP)

(72) Inventors: Yasushi Imanishi, Osaka (JP); Yuzuru Nanjo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/197,126

(22) Filed: May 2, 2025

(65) Prior Publication Data

US 2025/0348035 A1 Nov. 13, 2025

(30) Foreign Application Priority Data

May 13, 2024 (JP) ................................ 2024-078096

(51) Int. Cl.
*G03G 15/00* (2006.01)
*G03G 15/20* (2006.01)

(52) U.S. Cl.
CPC ....... *G03G 15/553* (2013.01); *G03G 15/2039* (2013.01); *G03G 15/2057* (2013.01); *G03G 15/2064* (2013.01); *G03G 15/80* (2013.01); *G03G 2215/2025* (2013.01)

(58) Field of Classification Search
CPC ........... G03G 15/2039; G03G 15/2053; G03G 15/2057; G03G 15/2064; G03G 15/553; G03G 15/80; G03G 2215/2025
See application file for complete search history.

(56) References Cited

U.S. PATENT DOCUMENTS

2019/0265627 A1* 8/2019 Kitabayashi ....... G03G 15/2042
2020/0019105 A1* 1/2020 Ebihara .............. G03G 15/2028
2020/0033784 A1* 1/2020 Takada ............... G03G 15/2032

FOREIGN PATENT DOCUMENTS

JP 2019-008097 A 1/2019
JP 2023-001981 A 1/2023

* cited by examiner

*Primary Examiner* — Hoang X Ngo
(74) *Attorney, Agent, or Firm* — Stein IP, LLC

(57) ABSTRACT

An image forming apparatus includes an image forming portion, a fixing device, a fixing voltage power supply, and a control portion. The fixing device includes an endless fixing belt, a fixing roller inside it with a metal base and an elastic layer on its outer circumference, a pressing roller in pressed contact with the fixing roller across the fixing belt, and an induction heating portion heating the fixing belt. The control portion calculates, as a cumulative electric power supply time, the cumulative value of the supply time of a predetermined electric power supplied to the induction heating portion, and determines the remaining lifetime of the fixing roller by comparing, as its lifetime, the failure time y [min] of the elastic layer, calculated with the supplied electric power substituted in the damage electric power x [W] in lifetime prediction formula (1), with the cumulative electric power supply time.

5 Claims, 7 Drawing Sheets

IMAGE FORMING APPARATUS THAT CAN PREDICT A LIFE OF THE FIXING ROLLER

INCORPORATION BY REFERENCE

This application is based on and claims the benefit of priority from Japanese Patent Application No. 2024-078096 filed on May 13, 2024, the contents of which are hereby incorporated by reference.

BACKGROUND

The present disclosure relates to an image forming apparatus including a fixing device using an induction heating method, such as a copier, a printer, a facsimile machine, or a multifunction peripheral with their functions, and in particular to a method for predicting the lifetime of a fixing roller.

In an image forming apparatus, for the purpose of fixing a toner image to a sheet, a fixing device is commonly used which includes a fixing member having a fixing roller or a fixing belt (i.e., heated rotary member) and a pressing roller (pressing rotary member) in pressed contact with each other. The fixing device of a belt fixing type using the fixing belt employs the induction heating method in which a heating layer of the fixing belt is heated by electromagnetic induction.

In the fixing device using the induction heating method, when the heating layer of the fixing belt is heated by an induction heating portion, most of the magnetic flux generated from the induction heating portion is converted into heat energy in the heating layer. However, a small portion of the magnetic flux passes through the heating layer to become leakage flux, which can heat another component inside the fixing device.

For example, with a fixing roller having a metal base and an elastic layer disposed inside the fixing belt, as the leakage flux reaches the metal base of the fixing roller, the metal base is slightly heated due to surface resistance. If the heat accumulates, it surpasses the heat resistance of the elastic layer, which thus gradually loses its elasticity and deteriorates. The time for the elastic layer to deteriorate to become unusable depends on the temperature of the metal base and the cumulative heated time.

SUMMARY

According to one aspect of the present disclosure, an image forming apparatus includes an image forming portion, a fixing device, a fixing voltage power supply, and a control portion. The image forming portion forms a toner image on a recording medium. The fixing device includes an endless fixing belt, a fixing roller disposed inside the fixing belt and having a metal base and an elastic layer laid on the outer circumferential surface of the metal base, a pressing roller disposed in pressed contact with the fixing roller across the fixing belt to form a fixing nip portion, and an induction heating portion heating the fixing belt. The fixing device heats and presses the recording medium passing through the fixing nip portion to fix the toner image to the recording medium. The fixing voltage power supply applies a voltage to the induction heating portion. The control portion controls the image forming portion, the fixing device, and the fixing voltage power supply. The control portion calculates, as a cumulative electric power supply time, the cumulative value of the electric power supply time for which a predetermined supplied electric power is supplied to the induction heating portion, takes, as the lifetime of the fixing roller, the failure time y [min] of the elastic layer calculated with the supplied electric power substituted in the damage electric power x [W] in lifetime prediction formula (1) below, and compares the lifetime of the fixing roller with the cumulative electric power supply time to determine the remaining lifetime of the fixing roller:

$$y = 2.57E + 08e^{-7.27E-0.3x} \tag{1}$$

DETAILED DESCRIPTION

Figure 1:
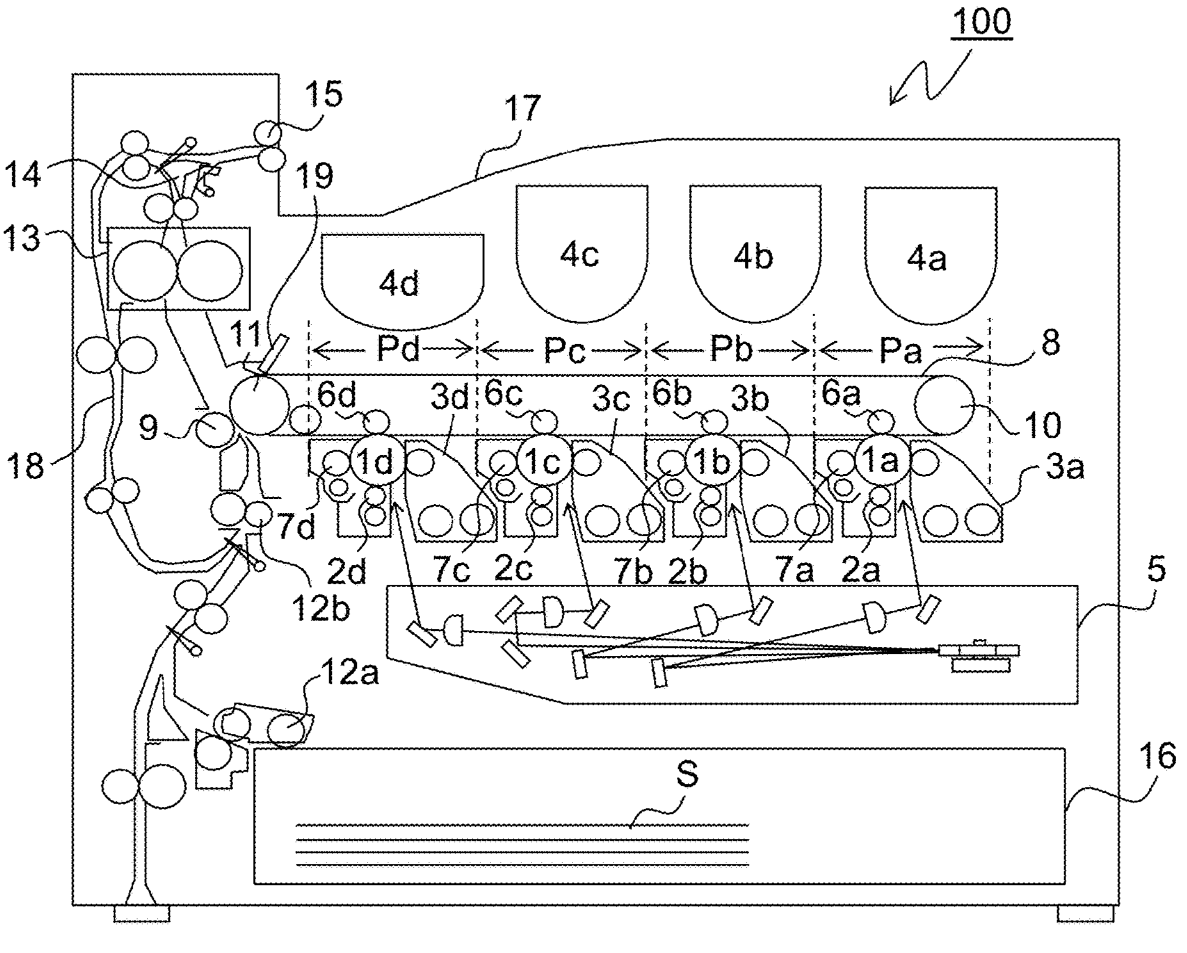
FIG. 1 is a schematic sectional view of the internal structure of an image forming apparatus according to one embodiment of the present disclosure.

1. Overall Configuration of Image Forming Apparatus: An embodiment of the present disclosure will be described below with reference to the accompanying drawings. FIG. 1 is a schematic sectional view of the internal structure of an image forming apparatus 100 according to one embodiment of the present disclosure. In the body of the image forming apparatus 100 (here, a color printer), four image forming portions Pa, Pb, Pc, and Pd are disposed in this order from upstream along the conveyance direction (from right in FIG. 1). The image forming portions Pa to Pd are provided so as to correspond to images of four different colors (cyan, magenta, yellow, and black) and sequentially form a cyan, a magenta, a yellow, and a black image respectively, each through the processes of electrostatically charging, exposure to light, image development, and image transfer.

The image forming portions Pa to Pd are provided with photosensitive drums (image carrying members) 1*a*, 1*b*, 1*c*, and 1*d* carrying visible images (toner images) of the different colors. In addition, an intermediate transfer belt 8 that rotates clockwise in FIG. 1 is provided adjacent to the image forming portions Pa to Pd. The toner images formed on the photosensitive drums 1*a* to 1*d* are primarily transferred sequentially, one top of another, to the intermediate transfer belt 8 that moves while in contact with the photosensitive drums 1*a* to 1*d*. Then, the toner images primarily transferred to the intermediate transfer belt 8 are secondarily transferred to a sheet S, as one example of a recording medium by a secondary transfer roller 9. The sheet S having the toner images secondarily transferred to it then has the toner images fixed to it by a fixing device 13 and is then discharged out of the body of the image forming apparatus 100. While a main motor 50 (see FIG. 4) rotates the photosensitive drums 1*a* to 1*d* counterclockwise in FIG. 1, the photosensitive drums 1*a* to 1*d* are subjected to an image formation process.

The sheets S to which the toner images are to be secondarily transferred are stored in a sheet cassette 16 disposed in a lower part of the body of the image forming apparatus 100 and are conveyed via a sheet feed roller 12*a* and a pair of registration rollers 12*b* to a nip portion between the secondary transfer roller 9 and a driving roller 11 for the intermediate transfer belt 8. As the intermediate transfer belt 8, a sheet of a dielectric resin is used, which is typically a belt without a seam (seamless belt). In addition, downstream of the secondary transfer roller 9, a belt cleaner 19 in a blade shape is provided, that removes toner and the like left on the surface of the intermediate transfer belt 8.

Now, the image forming portions Pa to Pd will be described. Around and below the photosensitive drums 1*a* to 1*d* disposed so as to be rotatable, there are provided charging devices 2*a*, 2*b*, 2*c*, and 2*d* that electrostatically charges the photosensitive drums 1*a* to 1*d*, an exposure device 5 that irradiates the photosensitive drums 1*a* to 1*d* with light based on image information, development devices 3*a*, 3*b*, 3*c*, and 3*d* that form the toner images on the photosensitive drums 1*a* to 1*d*, and cleaning devices 7*a*, 7*b*, 7*c*, and 7*d* that remove developer (toner) and the like left on the photosensitive drums 1*a* to 1*d*.

When image data is fed in from a host device such as a personal computer, first, the charging devices 2*a* to 2*d* electrostatically charge the surfaces of the photosensitive drums 1*a* to 1*d* evenly. Next, the exposure device 5 shines light based on the image data to form electrostatic latent images based on the image data on the photosensitive drums 1*a* to 1*d* respectively. The development devices 3*a* to 3*d* are loaded with predetermined amounts of two-component developer containing toner of different colors, namely, cyan, magenta, yellow, and black. Note that, as the toner images are formed as described later, when the proportion of the toner in the two-component developer loaded in the development devices 3*a* to 3*d* falls below a prescribed value, toner is supplied from toner containers 4*a* to 4*d* to the development devices 3*a* to 3*d* respectively. The toner in the developer is fed to the photosensitive drums 1*a* to 1*d* by the development devices 3*a* to 3*d* to electrostatically attach to them. In this way, the toner images based on the electrostatic latent images formed by exposure to light from the exposure device 5 are formed.

Then, primary transfer rollers 6*a* to 6*d* produce an electric field with a predetermined transfer voltage between the primary transfer rollers 6*a* to 6*d* and the photosensitive drums 1*a* to 1*d* so as to primarily transfer the cyan, magenta, yellow, and black toner images on the photosensitive drums 1*a* to 1*d* to the intermediate transfer belt 8. These images of four colors are formed in a predetermined positional relationship determined in advance so as to form a predetermined full-color image. After primary transfer, the toner and the like left on the surfaces of the photosensitive drums 1*a* to 1*d* are removed by the cleaning devices 7*a* to 7*d* in preparation for the subsequent formation of new electrostatic latent images.

The intermediate transfer belt 8 is wound around a driven roller 10, upstream, and the driving roller 11, downstream. As a belt drive motor (not shown) rotates the driving roller 11, the intermediate transfer belt 8 starts to rotate clockwise; thus the sheet S is conveyed, with predetermined timing, from the pair of registration rollers 12*b* to the nip portion (secondary transfer nip portion) between the driving roller 11 and the secondary transfer roller 9 disposed adjacent to it, so that a full-color image on the intermediate transfer belt 8 secondarily transferred to the sheet S. The sheet S having the toner image secondarily transferred to it is conveyed to the fixing device 13.

The sheet S conveyed to the fixing device 13 is heated and pressed by a fixing belt 20 and a pressing roller 22 (see FIG. 2) so that the toner images are fixed to the surface of the sheet S to form a predetermined full-color image. The sheet S having the full-color image formed on it has its conveyance direction sorted by a branching portion 14 branching in a plurality of directions to be discharged as it is (or after being conveyed to a reversing conveyance passage 18 and having images formed on both sides) to a discharge tray 17 by a pair of discharging rollers 15.

Figure 2:
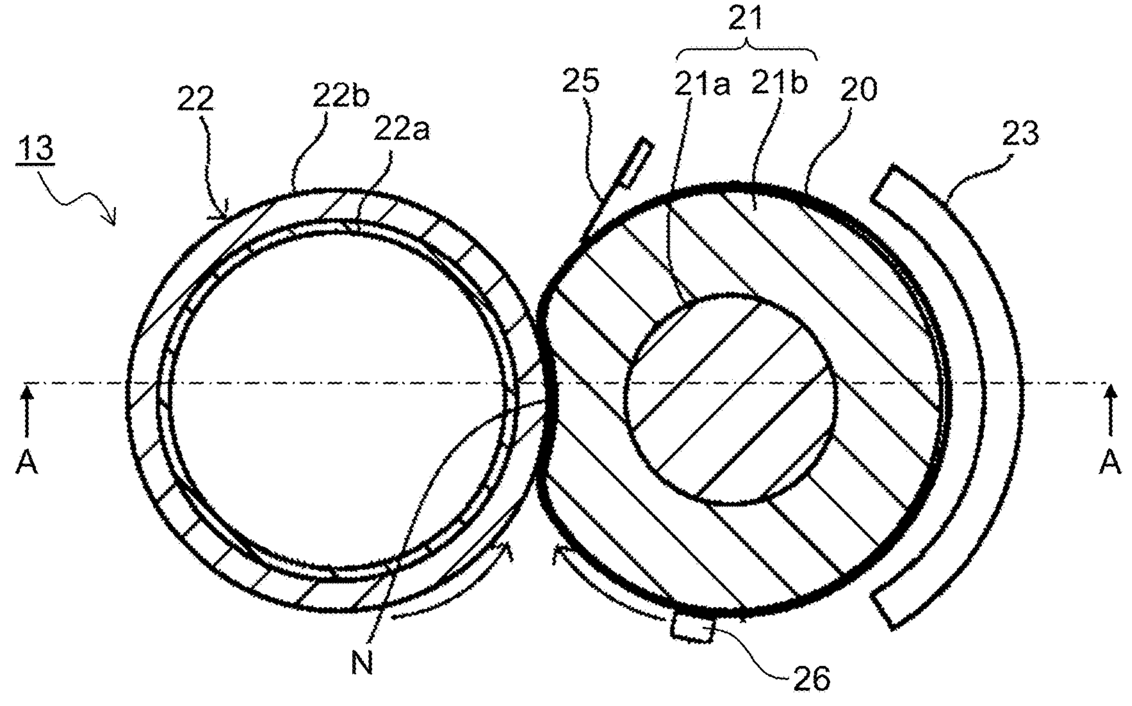
FIG. 2 is a side sectional view of a fixing device mounted in the image forming apparatus.
Figure 3:
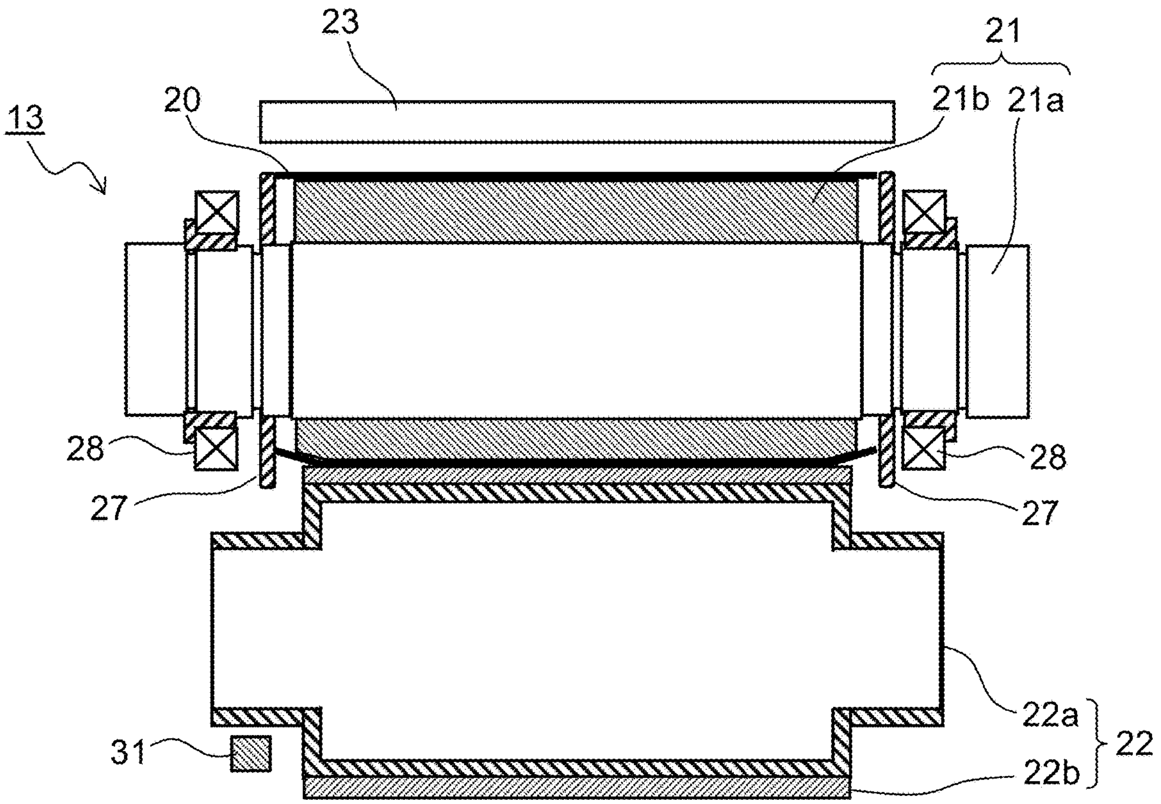
FIG. 3 is a plan sectional view of the fixing device cut along the axial direction.

2. Configuration of Fixing Device: FIG. 2 is a side sectional view of the fixing device 13 mounted in the image forming apparatus 100. FIG. 3 is a plan sectional view of the fixing device 13 cut along the axial direction (a sectional view from the direction indicated by arrows A and A in FIG. 2). Note that the top of FIG. 2 corresponds to the downstream side in a sheet passing direction (the conveyance direction) with respect to the fixing device 13 and the bottom of FIG. 2 corresponds to the upstream side in the sheet passing direction with respect to the fixing device 13. As shown in FIGS. 2 and 3, the fixing device 13 includes the fixing belt 20, a fixing roller 21, the pressing roller 22, an induction heating portion 23, a separation member 25, and a fixing temperature sensor 26.

The fixing belt 20 is supported on a housing (not shown) of the fixing device 13 so as to be rotatable about a horizontal axis. The fixing belt 20 is endless, is formed in a cylindrical shape with an outer diameter of, for example, 20 mm to 50 mm, and has an axial length (i.e., length along the width direction of the sheet S) approximately the same as that of the pressing roller 22. The fixing belt 20 rotates clockwise in FIG. 2 along the passing direction of the sheet S as the recording medium. Restriction members 27 that restricts lateral motion of the fixing belt 20 are disposed adjacent to opposite end parts of the fixing belt 20 along its axial direction.

The fixing belt 20 has a stacked structure having, laid on the outer circumference of a heating layer as a base layer, an elastic layer and a release layer. The heating layer is formed of a film of metal such as nickel with a thickness of, for example, 30 μm to 50 μm, or a polyimide film mixed with a powder of metal such as copper, silver, or aluminum, with a thickness of, for example, 50 μm to 100 μm. The elastic layer is made of silicone rubber or the like with a thickness of, for example, 100 μm to 300 μm. The separation layer is made of a fluorine containing resin such as PFA (tetrafluoroethylene-perfluoroalkylvinyl ether copolymer) with a thickness of, for example, 20 μm to 30 μm.

The fixing roller 21 includes a metal base 21*a* and an elastic layer 21*b*. The metal base 21*a* is made of metal such as aluminum. The metal base 21*a* is supported on a bearing portion 28 provided in the housing of the fixing device 13 so as to be rotatable about a horizontal axis. The elastic layer 21*b* is a layer of an elastic material laid on the outer circumferential surface of the metal base 21*a*. The elastic layer 21*b* is a layer of, for example, foam silicone rubber.

The pressing roller 22 is supported on the housing of the fixing device 13 so as to be rotatable about a horizontal axis.

The pressing roller 22 is in a cylindrical shape and has approximately the same axial length (length along the width direction of the sheet S) as the fixing belt 20. The pressing roller 22 is acted on by a predetermined pressure from a pressing mechanism 30 (see FIG. 4) toward the fixing belt 20. The outer circumferential surface of the pressing roller 22 presses a nip forming member 24 via the fixing belt 20 and is thus brought into pressed contact with the outer circumferential surface of the fixing belt 20 to form a fixing nip portion N. The pressing roller 22 includes a metal base 22*a* and an elastic layer 22*b*.

The pressing roller 22 is coupled to a fixing drive motor 45 (see FIG. 4) and rotates counterclockwise in FIG. 2. The pressing roller 22 makes contact with the outer circumferential surface of the fixing belt 20 under a predetermined pressure to exert a rotational driving force in the clockwise direction on the fixing belt 20.

The pressing roller 22 has a stacked structure having the elastic layer 22*b* laid on the outer circumference of the metal base 22*a* and a release layer (not shown) laid on the surface of the elastic layer 22*b*. The metal base 22*a* is formed of metal such as aluminum with a diameter of, for example, around 20 mm. The elastic layer 22*b* is formed of silicone rubber or the like with a thickness of, for example, about 8 mm. The release layer is formed of a fluorine containing resin such as PFA with a thickness of, for example, about 10 μm to 50 μm.

The induction heating portion 23 is disposed opposite the outer circumferential surface of the fixing belt 20 across a predetermined gap in a region opposite from the pressing roller 22 with respect to the fixing belt 20. The induction heating portion 23 extends slightly longer than the fixing belt 20 along the axial direction of the fixing belt 20 (i.e., the width direction of the sheet S, the direction perpendicular to the plane of FIG. 2). The induction heating portion 23 heats the heating layer of the fixing belt 20 by induction heating, thereby heating the fixing belt 20.

The induction heating portion 23 includes an excitation coil, a holding member, a core, and the like (none are shown). The excitation coil and the core are held at predetermined positions by the holding member. The excitation coil is formed of litz wire with a plurality of lead wires bundled together and is wound so as to extend along the axial direction of the fixing belt 20. The excitation coil is formed in an arc shape along the outer circumferential surface of the fixing belt 20 in the circumferential direction of the fixing belt 20.

Downstream of (in FIG. 2, above) the fixing nip portion N with respect to the sheet passing direction, the separation member 25 is disposed. The separation member 25 separates the sheet S after fixing it from the surface of the fixing belt 20. The separation member 25 is disposed at a predetermined angle, with a tip part of it pointing upstream (in the counter direction) with respect to the rotational direction of the fixing belt 20 such that the tip part is close to the outer circumferential surface of the fixing belt 20.

The fixing temperature sensor 26 measures the temperature of the fixing belt 20. The fixing temperature sensor 26 is, for example, a thermistor. The temperature measured by the fixing temperature sensor 26 is used in the control of the fixing temperature. The control of the fixing temperature is feedback control in which the temperature measured by the fixing temperature sensor 26 is compared with a previously set fixing temperature (target temperature) to control the supply of electricity from a fixing voltage power supply 55 (see FIG. 4) to the induction heating portion 23.

Near the pressing roller 22, a pressing temperature sensor 31 is disposed. The pressing temperature sensor 31 is, for example, a thermistor. The temperature measured by the pressing temperature sensor 31 is used in the estimation of the temperature of the metal base 21*a* of the fixing roller 21 as will be described later.

Figure 4:
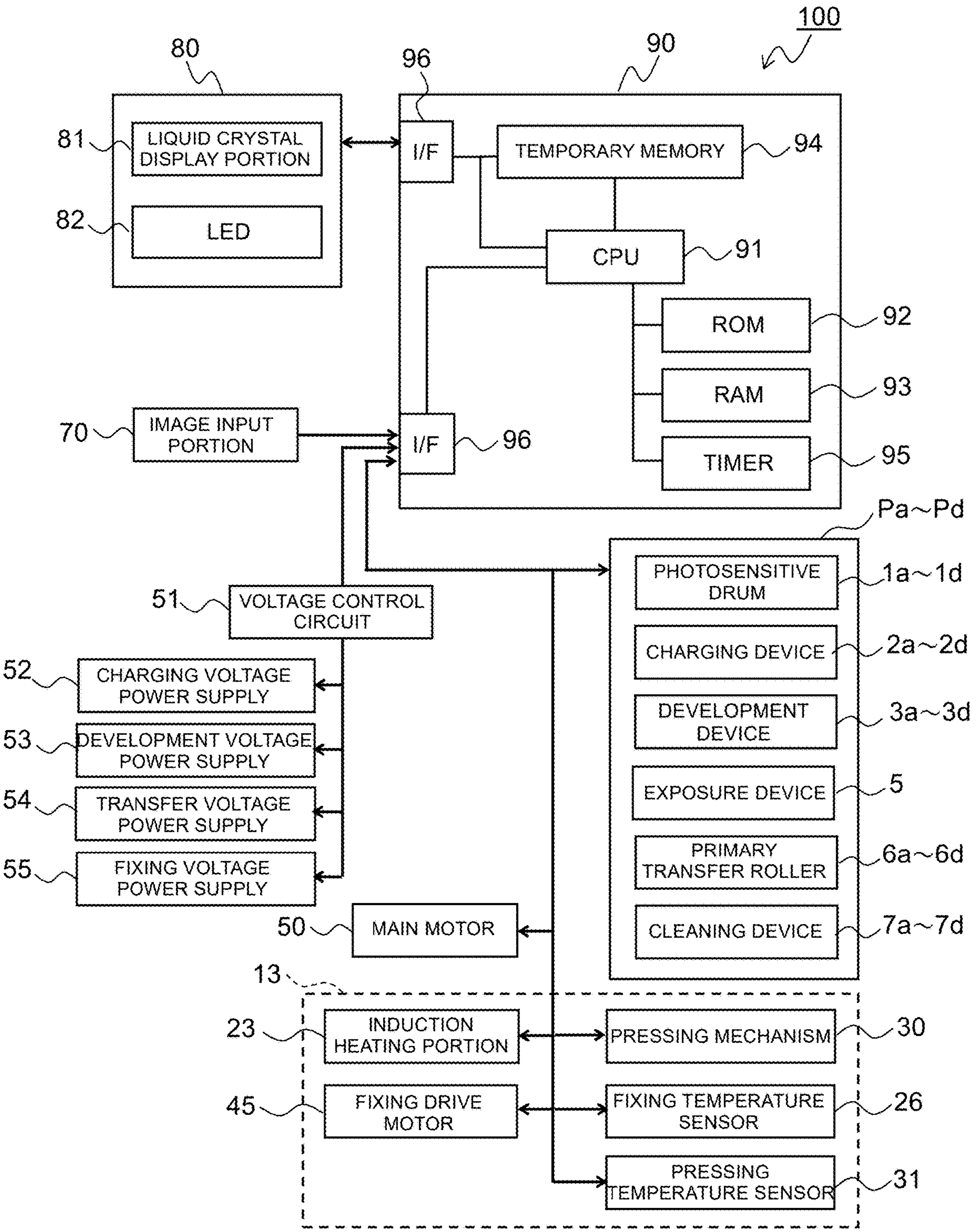
FIG. 4 is a block diagram showing one example of control paths in the image forming apparatus.

3. Control Path in Image Forming Apparatus: FIG. 4 is a block diagram showing one example of control paths in the image forming apparatus 100. Note that, since the use of the image forming apparatus 100 involves various kinds of control for different parts of it, the following description focuses on those control paths that are required to implement the present disclosure. For the parts already mentioned, no description will be repeated.

A voltage control circuit 51 is connected to a charging voltage power supply 52, a development voltage power supply 53, a transfer voltage power supply 54, and the fixing voltage power supply 55, and operates these power supplies according to output signals from a control portion 90. According to control signals from the voltage control circuit 51, the charging voltage power supply 52 applies a predetermined voltage to the charging devices 2*a* to 2*d*, so does the development voltage power supply 53 to the development devices 3*a* to 3*d*, so does the transfer voltage power supply 54 to the primary transfer rollers 6*a* to 6*d* and the secondary transfer roller 9, and so does the fixing voltage power supply 55 to the induction heating portion 23 in the fixing device 13.

An image input portion 70 is a receiving portion that receives image data transmitted from the personal computer or the like to the image forming apparatus 100. An image signal input from the image input portion 70 is converted to a digital signal to be transmitted to a temporary memory 94.

An operation portion 80 includes a liquid crystal display portion 81 and also LEDs 82 that indicate various states, and displays the status of the image forming apparatus 100, the progress of image formation, and the number of copies printed. Through the operation portion 80, it is possible to specify from where to feed the sheet S, the sheet cassette 16 or a manual sheet feed tray (not shown) and thereby input the type or size of the sheet S. Various settings of the image forming apparatus 100 can be made through a printer driver on the personal computer.

The control portion 90 at least includes a CPU (central processing unit) 91 as a central arithmetic processing device, a ROM (read only memory) 92 as a memory for reading only, a RAM (random access memory) 93 as a readable-writable memory, the temporary memory 94 for temporarily storing image data and the like, a timer 95, a plurality of (here, two) I/Fs (interfaces) 96 for transmitting control signals to the different devices in the image forming apparatus 100 and receiving input signals from the operation portion 80.

The ROM 92 stores, for example, programs for controlling the image forming apparatus 100 as well as data not changed during the use of the image forming apparatus 100, such as numerical values necessary in control. The RAM 93 stores, for example, necessary data obtained in controlling the image forming apparatus 100 and temporarily necessary data for controlling the image forming apparatus 100.

The temporary memory 94 temporarily stores the image signal input from the image input portion 70 and converted into the digital signal. The timer 95 measures the duration of voltage supply from the fixing voltage power supply 55 to the induction heating portion 23.

Figure 5:
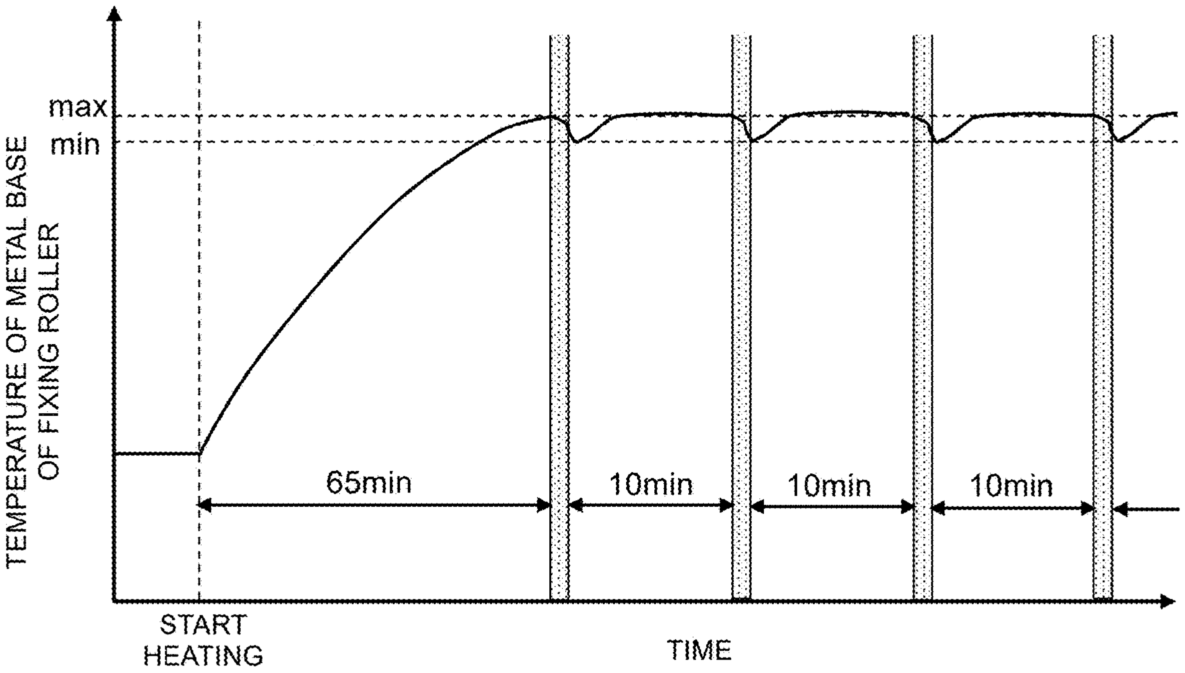
FIG. 5 is a graph showing the relationship between the printing time and the temperature of a metal base of a fixing roller in the image forming apparatus according to the embodiment.

4. Control for Predicting Lifetime of Fixing Roller: Now, a description will be given of the control for predicting the lifetime of the fixing roller 21 in the fixing device 13 in the image forming apparatus 100 according to the present embodiment. FIG. 5 is a graph showing the relationship between the printing time and the temperature of the metal base 21*a* of the fixing roller 21 in the image forming apparatus 100. FIG. 5 shows the change of the temperature of the metal base 21*a* observed when, after the start of heating the fixing belt 20 followed by 65 minutes of continuous printing, ten minutes of continuous printing is performed repeatedly with one minute's interval (idling time, the region hatched in FIG. 5) in between.

As shown in FIG. 5, the temperature of the metal base 21*a* gradually rises from immediately after the start of heating the fixing belt 20 and then fluctuates between the maximum value (214.2° C.) and the minimum value (211.0° C.). This results from part of the magnetic flux generated from the induction heating portion 23 passing through the heating layer of the fixing belt 20 to reach the metal base 21*a* of the fixing roller 21.

As a result, if successive printing on a large number of sheets is performed on end, the metal base 21*a* of the fixing roller 21 is heated so that the temperature of the metal base 21*a* remains high all the time. This can promote thermal deterioration (embrittlement) of the elastic layer 21*b* and damage the elastic layer 21*b*.

To cope with this, in the image forming apparatus 100 according to the embodiment, the lifetime of the elastic layer 21*b* of the fixing roller 21 is predicted based on the electric power supplied from the fixing voltage power supply 55 to the induction heating portion 23. Specifically, the lifetime prediction formula (material failure formula) (1) given below is used to determine the lifetime (failure time) of the elastic layer 21*b* of the fixing roller 21 according to the value of the supplied electric power (damage electric power):

$$y = 2.57E+08e^{-7.27E-0.3x} \qquad (1)$$

where x represents damage electric power [W]; and y represents failure time [min] of the elastic layer.

Figure 8:
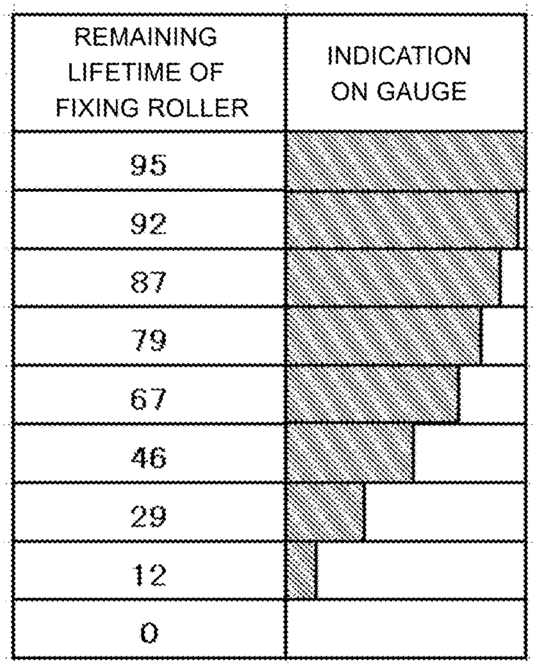
FIG. 8 shows an example of the remaining lifetime of the fixing roller indicated on a gauge.

The determined lifetime is then compared with a cumulative electric power supply time as the cumulative value of electric power supply time to determine the remaining lifetime (timing of becoming unusable) of the elastic layer 21*b* of the fixing roller 21. The determined remaining lifetime is indicated to a user. The remaining lifetime can be indicated, for example, on a gauge in the liquid crystal display portion 81 (see FIG. 4). Table 1 shows one example of damage electric power, lifetime of the elastic layer 21*b* (i.e., the printable number of sheets), contribution factor of damage electric power for deterioration relative to the target lifetime (here, 600 k sheets) of the elastic layer 21*b*, and remaining lifetime. In addition, FIG. 8 shows an example of the remaining lifetime of the fixing roller 21 indicated on the gauge.

TABLE 1

| DAMAGE ELECTRIC POWER [W] | FAILURE TIME [min] OF ELASTIC LAYER | LIFETIME OF FIXING ROLLER [k SHEETS] *1 | CON-TRIBUTION FACTOR [%] *2 | REMAINING LIFETIME [%] *2 |
|---|---|---|---|---|
| 1000 | 178227 | 12476 | 4.8 | 95 |
| 1067 | 109734 | 7681 | 7.8 | 92 |
| 1133 | 67563 | 4729 | 12.7 | 87 |

TABLE 1-continued

| DAMAGE ELECTRIC POWER [W] | FAILURE TIME [min] OF ELASTIC LAYER | LIFETIME OF FIXING ROLLER [k SHEETS] *1 | CON-TRIBUTION FACTOR [%] *2 | REMAINING LIFETIME [%] *2 |
|---|---|---|---|---|
| 1200 | 41598 | 2912 | 20.6 | 79 |
| 1267 | 25612 | 1793 | 33.5 | 67 |
| 1333 | 15769 | 1104 | 54.4 | 46 |
| 1371 | 12019 | 841 | 71.3 | 29 |
| 1400 | 9709 | 680 | 88.3 | 12 |
| 1412 | 8571 | 600 | 100.0 | 0 |

*1 The number of sheets printed at a process linear velocity of 70 [sheets/min].
*2 The value relative to 600 k printed sheets taken as 100%.

As shown in Table 1 and FIG. 8, the greater the supplied electric power (damage electric power), the shorter the time until the failure of the elastic layer 21*b* and the shorter the lifetime of the fixing roller 21 (the printable number of sheets). It can be understood that, when the supplied electric power is 1417 [W], the lifetime of the fixing roller 21 equals the target lifetime (600 k sheets).

With the method described above, based on the supplied electric power actually supplied from the fixing voltage power supply 55 to the induction heating portion 23 and the cumulative electric power supply time, the lifetime of the elastic layer 21*b* of the fixing roller 21 can be predicted. This, compared with the conventional method of prediction using a previously stored lifetime prediction table, allows precise prediction of the lifetime of the fixing roller 21 (elastic layer 21*b*).

Here, immediately after the start of heating the fixing belt 20 or the like and in addition the electric power supply time is 15 minutes or less, the metal base 21*a* of the fixing roller 21 does not become so high as to promote thermal deterioration of the elastic layer 21*b*. That is, for the temperature of the metal base 21*a* to become so high as to promote thermal deterioration of the elastic layer 21*b* requires 15 minutes or more after the start of heating. Thus, according to the temperature of the metal base 21*a* at the power-on of the image forming apparatus 100 or on its recovery from sleep (power-saving) mode, a time (cumulation standby time) is secured during which the electric power supply time is not cumulated.

To estimate the temperature of the metal base 21*a* of the fixing roller 21, the temperature of the pressing roller 22 is preferably used as a substitute. Since the pressing roller 22 is not directly heated by the induction heating portion 23, its temperature can be detected more accurately. Specifically, the correlation between the temperatures of the pressing roller 22 and the metal base 21*a* of the fixing roller 21 is previously tabulated and stored in the ROM 92 (or the RAM 93), and based on the temperature of the pressing roller 22 measured by the pressing temperature sensor 31, the temperature of the metal base 21*a* is estimated.

For example, if the pressing roller 22 has a temperature of 40° C. or less, the metal base 21*a* is estimated to have a normal temperature. Thus, for 60 minutes after power-on or recovery from sleep (power-saving) mode, the supplied electric power is not cumulated.

If the pressing roller 22 has a temperature of 41° C. or more but 80° C. or less, the metal base 21*a* is estimated to have a high temperature (130° C. or less). Thus, for 30 minutes after power-on or recovery from sleep (power saving) mode, the supplied electric power is not cumulated. If the pressing roller 22 has a temperature of 81° C. or more, the metal base 21*a* is estimated to have a very high temperature (around 200° C.). Thus, for 15 minutes after power-on or recovery from sleep (power saving) mode, the supplied electric power is not cumulated.

In this way, securing the cumulation standby time serves to prevent the inconvenience of the electric power supply time that does not contribute to a rise in the temperature of the metal base 21*a* being cumulated. Thus, by only cumulating the electric power supply time that actually contributes to a rise in the temperature of the metal base 21*a*, it is possible to accurately predict the lifetime of the elastic layer 21*b*.

Figure 6:
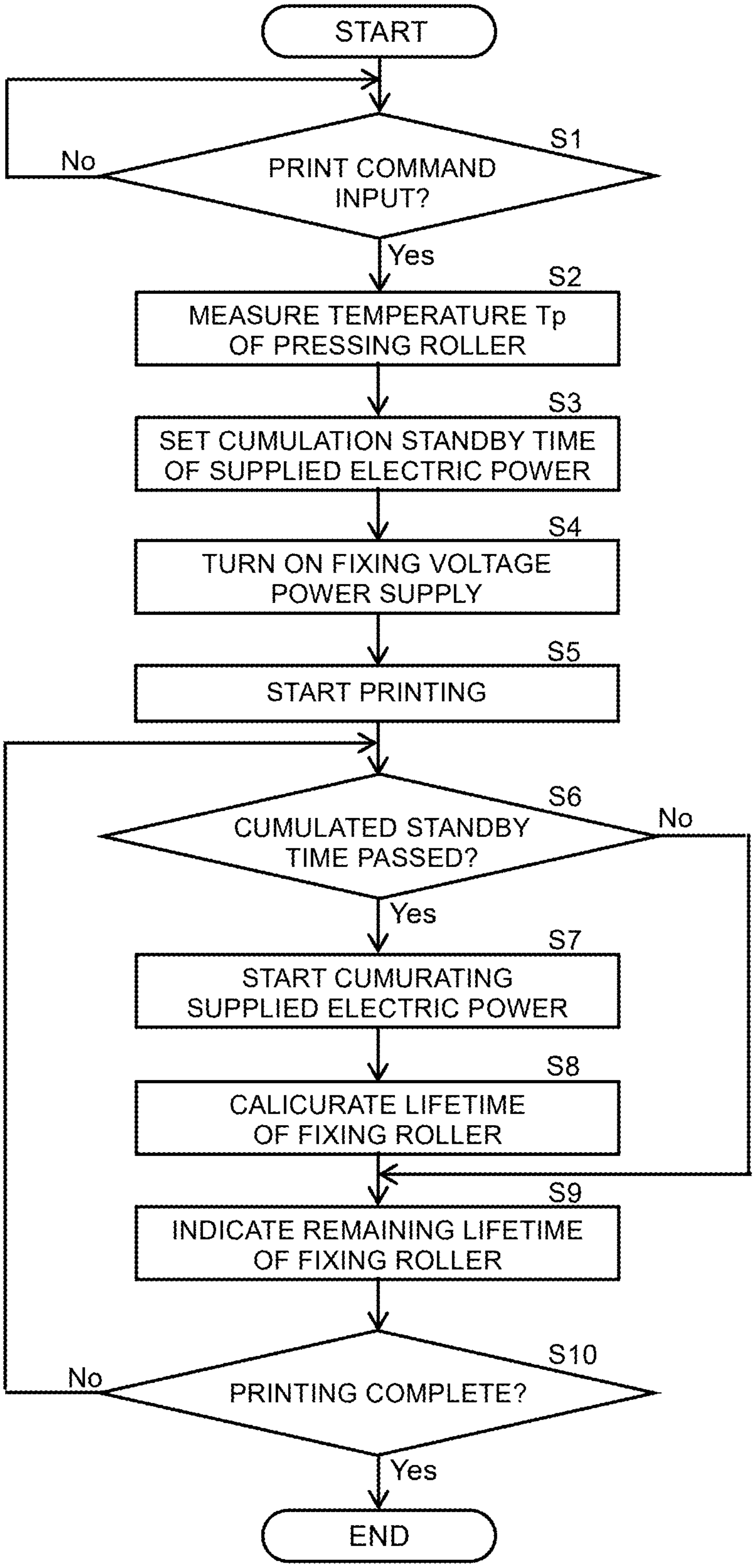
FIG. 6 is a flow chart showing one example of the control for predicting the lifetime of the fixing roller in the image forming apparatus according to the embodiment.

FIG. 6 is a flow chart showing one example of the control for predicting the lifetime of the fixing roller in the image forming apparatus 100 according to the embodiment. With reference also to FIGS. 1 to 5 as necessary and FIG. 7, which will be described later, the control for predicting the lifetime of the fixing roller will be described.

The control portion 90 checks whether a print command is input from a host device such as a personal computer (step S1). As long as no print command is input (No in step S1), a print standby state is continued. If a print command is input (Yes in step S1), with the pressing temperature sensor 31 the temperature Tp of the pressing roller 22 is measured (step S2). Then, the control portion 90 sets the cumulation standby time for the supplied electric power (step S3).

Figure 7:
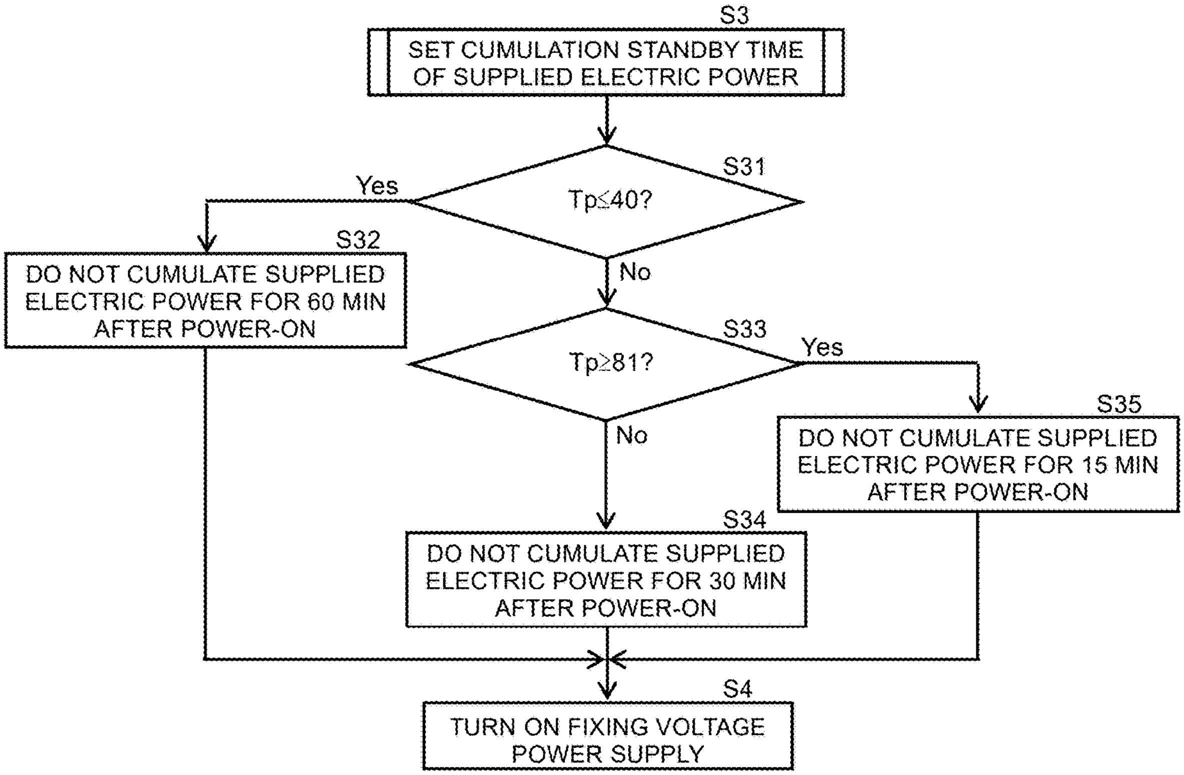
FIG. 7 is a flow chart showing an example of the control for setting the cumulation standby time in FIG. 6.

FIG. 7 is a flow chart showing an example of the control for setting the cumulation standby time in FIG. 6. In setting the cumulation standby time (step S3), the control portion 90 checks whether the temperature Tp of the pressing roller 22 measured in step S2 is 40° C. or less (step S31). If Tp≤40 [° C.] (Yes in step S31), the metal base 21*a* of the fixing roller 21 is estimated to have a normal temperature (cold start). Then, for 60 minutes after power-on, the supplied electric power is not cumulated (step S32). In other words, the cumulation standby time is set to 60 minutes.

If Tp>40 [° C.] (No in step S31), the control portion 90 checks whether the pressing roller 22 has a temperature Tp of 81° C. or more (step S33). If 40≤Tp≤80 [° C.] (No in step S31), the metal base 21*a* of the fixing roller 21 is estimated to have a high temperature (130° C. or less). Thus, for 30 minutes after power-on, the supplied electric power is not cumulated (step S34). In other words, the cumulation standby time is set to 30 minutes.

If Tp≥81 [° C.] (Yes in step S31), the metal base 21*a* of the fixing roller 21 is estimated to have a very high temperature (around 200° C.). Then, for 15 minutes after power-on, the supplied electric power is not cumulated (step S35). In other words, the cumulation standby time is set to 15 minutes.

The control portion 90 then turns on the fixing voltage power supply 55 (step S4). After the fixing temperature sensor 26 senses the fixing belt 20 reaching a predetermined fixing temperature, printing is started (step S5).

After turning on the fixing voltage power supply 55 in step S4, the control portion 90 checks whether the cumulation standby time set in step S3 has passed (step S6). If the cumulation standby time has passed (Yes in step S6), the cumulation of the supplied electric power is started (step S7). Based on the supplied electric power, the control portion 90 calculates the lifetime of the fixing roller 21 (elastic layer 21*b*) according to formula (1) (step S8). Then, the calculated lifetime of the elastic layer 21*b* is compared with the cumulative electric power supply time to predict the remaining lifetime of the fixing roller 21, which is indicated on the gauge in the liquid crystal display portion 81 (step S9).

If the cumulation standby time has not yet passed in step S6 (No in step S6), the supplied electric power is not cumulated, an advance is made to step S9, where the remaining lifetime of the fixing roller 21 based on the cumulative electric power supply time cumulated till then is indicated on the gauge in the liquid crystal display portion 81 (step S9).

It is then checked whether printing is complete (step S10) and, if printing continues (No in step S10), a return is made to step S6 to check the passage of the cumulation standby time, cumulate the supplied electric power, calculate the lifetime of the fixing roller, and indicate the remaining lifetime (steps S6 to S9). If printing is complete (Yes in step S10), the procedure is ended.

With the example of control shown in FIGS. 6 and 7, it is possible to precisely predict the lifetime of the elastic layer 21*b* of the fixing roller 21 based on the value of the electric power supplied from the fixing voltage power supply 55 to the induction heating portion 23 and the cumulative electric power supply time.

Securing the cumulation standby time to exclude the electric power supply time that does not contribute to a rise in the temperature of the metal base 21*a* and only cumulating the supplied electric power that actually contributes to a rise in the temperature of the metal base 21*a* allows more accurate prediction of the lifetime of the fixing roller 21.

In addition, indicating the remaining lifetime of the fixing roller 21 on the gauge in the liquid crystal display portion 81 allows a user to easily recognize the remaining lifetime of the fixing roller 21. Thus, it is possible to prepare a spare fixing roller 21 beforehand and this helps minimize periods in which printing cannot be done (i.e., downtime) from happening as much as possible.

The above embodiment is not meant as any limitation on the present disclosure and thus various modifications can be made without departing from the spirit of the present disclosure. For example, while the embodiment deals with the fixing device 13 of a uniaxial belt type with the fixing belt 20 wound around the fixing roller 21, application is also possible to a fixing device of a biaxial belt type with the fixing belt 20 wound around the fixing roller 21 and another roller.

In addition, the present disclosure finds applications not only in fixing devices, like the one 13 described in the above embodiment, using a vertical conveyance system in which the sheet S passes through a fixing nip portion N from bottom to top, but also in fixing devices using a horizontal conveyance system in which the sheet S passes through a fixing nip portion N horizontally.

The image forming apparatus 100 finds applications not only in tandem-type color printers like the one shown in FIG. 1, but also in various image forming apparatuses incorporating a fixing device, such as monochrome copiers, digital multifunction peripherals, facsimile machines, and laser printers. Now, by way of an example, the effect of the present disclosure will be described further in detail.

EXAMPLE

A description will be given of how the remaining lifetime of the fixing roller 21 is indicated in the image forming apparatus 100 shown in FIG. 1 with a constant electric power (damage electric power) supplied to the induction heating portion 23 of the fixing device 13 to heat the fixing belt 20. Note that for the cumulative time of the supplied electric power, an average electric power accumulated in the latest 15 minutes is cumulated per minute.

The process linear velocity of the image forming apparatus 100 was 70 [sheets/min] and the target lifetime (the printable number of sheets) was set to 600 [k sheets]. Here, the time necessary for printing 600 [k sheets] is 600,000/70≈8571 [min]. Substituting this value in formula (1) gives x≈1417 [W]. Table 2 shows, for the image forming apparatus 100 operated with the supplied electric power (damage electric power) kept constant at 1417 [W], the cumulative supplied electric power [W·min], the cumulative number of printed sheets [k sheets], and the remaining lifetime of the fixing roller 21. The remaining lifetime of the fixing roller 21 is indicated on the gauge as shown in FIG. 9.

TABLE 2

| DAMAGE ELECTRIC POWER [W] | CUMULATIVE SUPPLIED ELECTRIC POWER [W · min] | CUMULATIVE NUMBER OF PRINTED SHEETS [k sheets] | REMAINING LIFETIME [%] |
|---|---|---|---|
| 1417 | 0 | 0 | 100 |
| 1417 | 4048369 | 200 | 66 |
| 1417 | 8096738 | 400 | 33 |
| 1417 | 12145107 | 600 | 0 |

Figure 9:
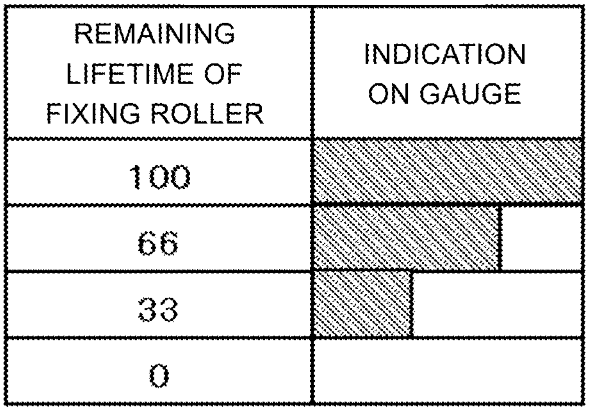
FIG. 9 shows the remaining lifetime of the fixing roller according to an example as indicated on the gauge.

As shown in Table 2 and FIG. 9, as the cumulative number of printed sheets increases, the cumulative supplied electric power increases and the remaining lifetime (gauge indication) of the fixing roller 21 decreases. The cumulative supplied electric power at the time when 600 k sheets have been printed is 1417 [W]×8571 [min]=12145107 [W·min] and, when this value is reached, the remaining lifetime of the fixing roller 21 is 0 [%]. Note that the remaining lifetime [%] of the fixing roller 21 is indicated on the gauge every minute and this allows accurate prediction of the timing with which the lifetime of the fixing roller 21 expires.

The present disclosure finds applications in image forming apparatuses including a fixing device using an induction heating method. Based on the present disclosure, it is possible to provide an image forming apparatus having a fixing device using an induction heating method that can accurately predict the deterioration of an elastic layer of a fixing roller.

What is claimed is:

1. An image forming apparatus comprising:

an image forming portion forming a toner image on a recording medium;

a fixing device including a fixing belt that is endless, a fixing roller disposed inside the fixing belt, the fixing roller having a metal base and an elastic layer laid on an outer circumferential surface of the metal base, a pressing roller disposed in pressed contact with the fixing roller across the fixing belt to form a fixing nip portion, and an induction heating portion heating the fixing belt, the fixing device heating and pressing the recording medium passing through the fixing nip portion to perform fixing whereby the toner image is fixed to the recording medium;

a fixing voltage power supply applying a voltage to the induction heating portion; and a control portion controlling the image forming portion, the fixing device, and the fixing voltage power supply, wherein the control portion calculates, as a cumulative electric power supply time, a cumulative value of electric power supply time for which a predetermined supplied electric power is supplied to the induction heating portion, takes, as a lifetime of the fixing roller, a failure time y [min] of the elastic layer calculated with the supplied electric power substituted in a damage electric power x [W] in lifetime prediction formula (1) below, and compares the lifetime of the fixing roller with the cumulative electric power supply time to determine a remaining lifetime of the fixing roller:

$$y = 2.57E + 08e^{-7.27E-0.3x}. \quad (1)$$

2. The image forming apparatus according to claim 1, wherein the control portion secures a cumulation standby time during which the electric power supply time is not cumulated based on a temperature of the metal base when the supplied electric power starts to be supplied to the induction heating portion.

3. The image forming apparatus according to claim 2, further comprising:

a pressing temperature sensor sensing a temperature of the pressing roller; and a memory storing a correlation between the temperatures of the pressing roller and the metal base, wherein the control portion estimates the temperature of the metal base based on the temperature of the pressing roller sensed by the pressing temperature sensor and the correlation stored in the memory.

4. The image forming apparatus according to claim 1, further comprising an indication portion indicating the remaining lifetime of the fixing roller.

5. The image forming apparatus according to claim 4, wherein the indication portion is a liquid crystal display portion that displays the remaining lifetime of the fixing roller in a form indicated on a gauge.

* * * * *